(12) United States Patent
Kim et al.

(10) Patent No.: US 9,788,295 B2
(45) Date of Patent: Oct. 10, 2017

(54) METHOD FOR DETERMINING ACTIVATION OF ISR CAPABILITY

(71) Applicant: LG Electronics Inc., Seoul (KR)

(72) Inventors: Hyunsook Kim, Seoul (KR); Jaehyun Kim, Seoul (KR); Laeyoung Kim, Seoul (KR); Taehyeon Kim, Seoul (KR)

(73) Assignee: LG Electronics Inc., Seoul ( * ) Notice: Subject to any disclaimer, the term of this patent is extended or adjusted under 35 U.S.C. 154(b) by 0 days.

(21) Appl. No.: 14/785,015

(22) PCT Filed: May 7, 2014

(86) PCT No.: PCT/KR2014/004045
§ 371 (c)(1),
(2) Date: Oct. 16, 2015

(87) PCT Pub. No.: WO2014/182061
PCT Pub. Date: Nov. 13, 2014

(65) Prior Publication Data
US 2016/0088582 A1    Mar. 24, 2016

Related U.S. Application Data

(60) Provisional application No. 61/820,187, filed on May 7, 2013, provisional application No. 61/820,186, filed on May 7, 2013.

(51) Int. Cl.
*H04W 60/00* (2009.01)
*H04W 28/06* (2009.01)
(Continued)

(52) U.S. Cl.
CPC .......... *H04W 60/00* (2013.01); *H04W 28/06* (2013.01); *H04W 60/04* (2013.01); *H04W 60/06* (2013.01);
(Continued)

(58) Field of Classification Search
CPC ..................................... H04W 60/00
See application file for complete search history.

(56) References Cited

U.S. PATENT DOCUMENTS

| 7,855,991 | B2 | 12/2010 | Hu | |
|---|---|---|---|---|
| 2011/0090848 | A1* | 4/2011 | Kim | H04W 60/00 370/328 |

(Continued)

FOREIGN PATENT DOCUMENTS

| KR | 1020110043405 | 4/2011 |
|---|---|---|
| KR | 1020120138791 | 12/2012 |
| WO | 2011133004 | 10/2011 |

*Primary Examiner* — John Blanton
(74) *Attorney, Agent, or Firm* — Dentons US LLP

(57) ABSTRACT

One disclosure of the present specification provides a method for determining whether to activate an idle mode signaling reduction (ISR) capability in a network entity for managing mobility of user equipment. The method for determining whether to activate the ISR capability comprises the steps of: obtaining information related to a proximity service of the user equipment; receiving from the user equipment a location refresh request message; determining whether to activate the ISR based on ISR capability information of a network node that had been just previously in charge of the user equipment, ISR capability information of the network entity, and information related to the proximity service of the user equipment; and transmitting a location refresh acceptance message to the user equipment after the determination.

10 Claims, 15 Drawing Sheets

(51) Int. Cl.
*H04W 60/06* (2009.01)
*H04W 76/02* (2009.01)
*H04W 60/04* (2009.01)
*H04W 8/00* (2009.01)

(52) U.S. Cl.
CPC ............ *H04W 76/02* (2013.01); *H04W 8/005* (2013.01); *H04W 60/005* (2013.01)

(56) References Cited

U.S. PATENT DOCUMENTS

| | | |
|---|---|---|
| 2011/0116449 A1 | 5/2011 | Hu et al. |
| 2012/0189016 A1 | 7/2012 | Bakker et al. |
| 2012/0275401 A1 | 11/2012 | Sun |
| 2013/0039324 A1* | 2/2013 | Kwon .................. H04W 72/04 370/329 |
| 2013/0157661 A1 | 6/2013 | Bhaskaran et al. |

* cited by examiner

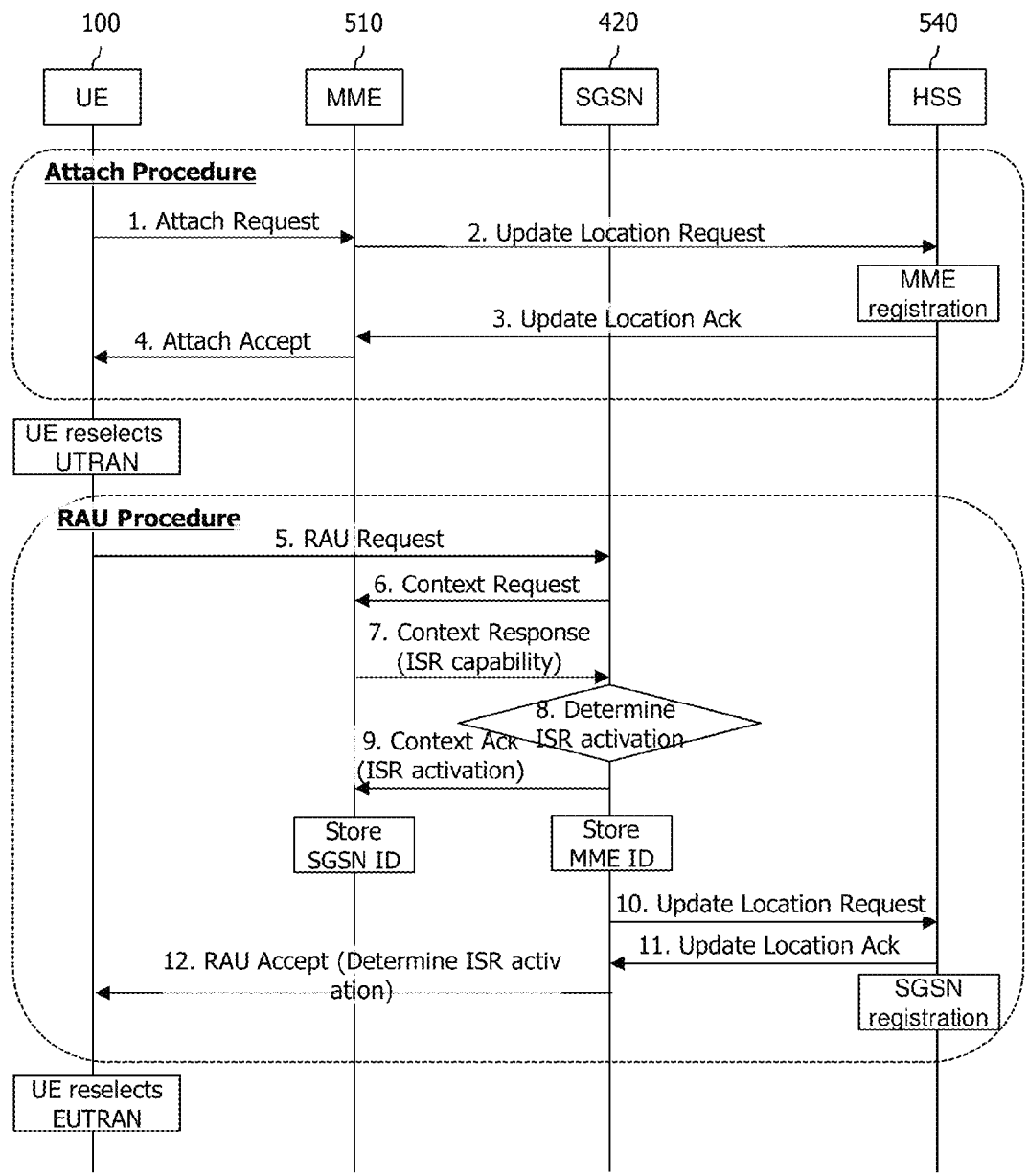

METHOD FOR DETERMINING ACTIVATION OF ISR CAPABILITY

This application is a 35 USC §371 National Stage entry of International Application No. PCT/KR2014/004045 filed on May 7, 2014, and claims priority to U.S. Provisional Application Nos. 61/820,187 filed on May 7, 2013 and 61/820,186 filed on May 7, 2013, all of which are hereby incorporated by reference in their entireties as if fully set forth herein.

BACKGROUND OF THE INVENTION

Field of the Invention

The present invention relates to a method of determining whether to activate an idle mode signaling reduction (ISR) capability.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a $4^{th}$ generation (4G) (i.e., LTE) network. A radio access network before the LTE, i.e., a $3^{rd}$ generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover) |
| S3 | It enables user and bearer information exchange for inter 3GPP access network mobility in Idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

Meanwhile, an E-UTRAN which is a radio access network for $4^{th}$ generation (4G) mobile communication requires high costs, and thus is not widespread as fast as expected. Therefore, a UTRAN which is a radio access network for $3^{rd}$ generation (3G) mobile communication and the E-UTRAN which is the radio access network for the 4G mobile communication may coexist. In such a situation, if a UE moves back and forth between the E-UTRAN and the UTRAN, a location registration frequently occurs. The frequent location registration leads to an increase in network signaling, which results in an introduction of an idle mode signaling reduction (ISR) scheme. In the ISR scheme, if the UE in an idle mode has moved back and forth one time between the E-UTRAN and the UTRAN and thus the location registration has been already achieved, the location registration may not be performed when the UE moves next time.

On the other hand, an increase in a user requirement for a social network service (SNS) results in a growing increase in a demand for proximity communication between physically adjacent UEs. Therefore, there is an ongoing discussion that the proximity communication between the UEs will be employed in a next generation system. However, a discovery between the UEs is necessary for the proximity communication between the UEs. Although the discovery may be performed directly between the UEs, it may also be performed with the assistance of the network.

Disadvantageously, when the aforementioned ISR is activated, since the location registration is not performed even if the UE in the idle mode moves back and forth between the E-UTRAN and the UTRAN, there is a problem in that the discovery between the UEs is not properly performed with the assistance of the network.

SUMMARY OF THE INVENTION

Accordingly, a disclosure of the present specification aims to provide a method capable of solving the aforementioned problem.

To acheive the aforementioned aim, a disclosure of the present specification provides a method of determining whether to activate an idle mode signaling reduction (ISR) capability in a network entity for managing mobility of a user equipment (UE). The method may comprise: obtaining information related to a proximity service of the UE; receiving from the UE a location update request message; determining whether to activate the ISR on the basis of ISR capability information of a network node by which the UE has been served just previously, ISR capability information of the network entity, and information related to the proximity service of the UE; and transmitting a location update accept message to the UE after the determination.

The location update request message may be a tracking area update (TAU) request message or a routing area update (RAU) request message.

The information related to the proximity service of the UE may comprise one or more of: capability information for the proximity service of the UE; proximity service enable state information of the UE; information regarding whether the UE is in a state capable of performing the proximity service or is scheduled to perform the proximity service; and information regarding a network-assisted discovery.

The information regarding the network-assisted discovery may comprise one or more of: information regarding whether the UE is a UE of a subscriber capable of using the network-assisted discovery service; and information regarding whether a specific service is in a state in which the network-assisted discovery service is allowed for use.

The method may further comprise: upon receiving the location update request message, transmitting a request message for a context of the UE to a network by which the UE has been served just previously; and receiving a context response message from the network node. Here, the context response message comprises information regarding an ISR capability of the network node.

The determining may comprise one or more of: confirming whether both of the network entity and the network node have an ISR capability on the basis of the ISR capability information of the network node and the ISR capability information of the network entity; confirming whether the UE is scheduled to perform the proximity service; and confirming whether a network-assisted discovery is scheduled to be performed.

In the determining, even if it is confirmed that both of the network entity and the network node have the ISR capability, the ISR may be determined to be deactivated when it is confirmed that the UE is scheduled to perform the proximity service and the network-assisted discovery is scheduled to be performed.

If the determination result shows that the ISR is not activated, the location update accept message comprises an update result indicating that only a location update is performed.

The network entity may be a mobile management entity (MME), and the network node by which the UE has been served just previously may be a serving general packet radio service support node (SGSN).

Meanwhile, a disclosure of the present specification also provides a method of determining whether to activate an idle mode signaling reduction (ISR) capability in a network entity for managing mobility of a user equipment (UE). The method may comprise: receiving by the network entity a context request message from a network node for newly serving the UE; determining whether there is an ISR capability to be included in a context response message in response to the context request message on the basis of information related to the proximity service of the UE; and transmitting to the network node the context response message generated depending on the determination.

The information related to the proximity service of the UE comprises one or more of: capability information regarding the proximity service of the UE; proximity service enable state information of the UE; information regarding whether the UE is in a state capable performing the proximity service or is scheduled to perform the proximity service; and information regarding a network-assisted discovery.

In the determining of whether there is the ISR capability, if it is confirmed that the UE is scheduled to perform the proximity service and the network-assisted discovery is scheduled to be performed, even if the network entity supports the ISR capability, the context response message is configured not to support the ISR capability.

If the network entity is a mobility management entity (MME), the network node is a serving general packet radio service support node (SGSN), and if the network entity is the SGSN, the network node is the MME.

According to a disclosure of the present specification, an idle mode signaling reduction (ISR) capability is deactivated for a proximity service, and thus a correct discovery is possible.

BRIEF DESCRIPTION OF THE DRAWINGS

FIG. 7 is a flowchart illustrating an idle mode signalign reduction (ISR) for solving the problem of FIG. 6.

DESCRIPTION OF EXEMPLARY EMBODIMENTS

Figure 1:
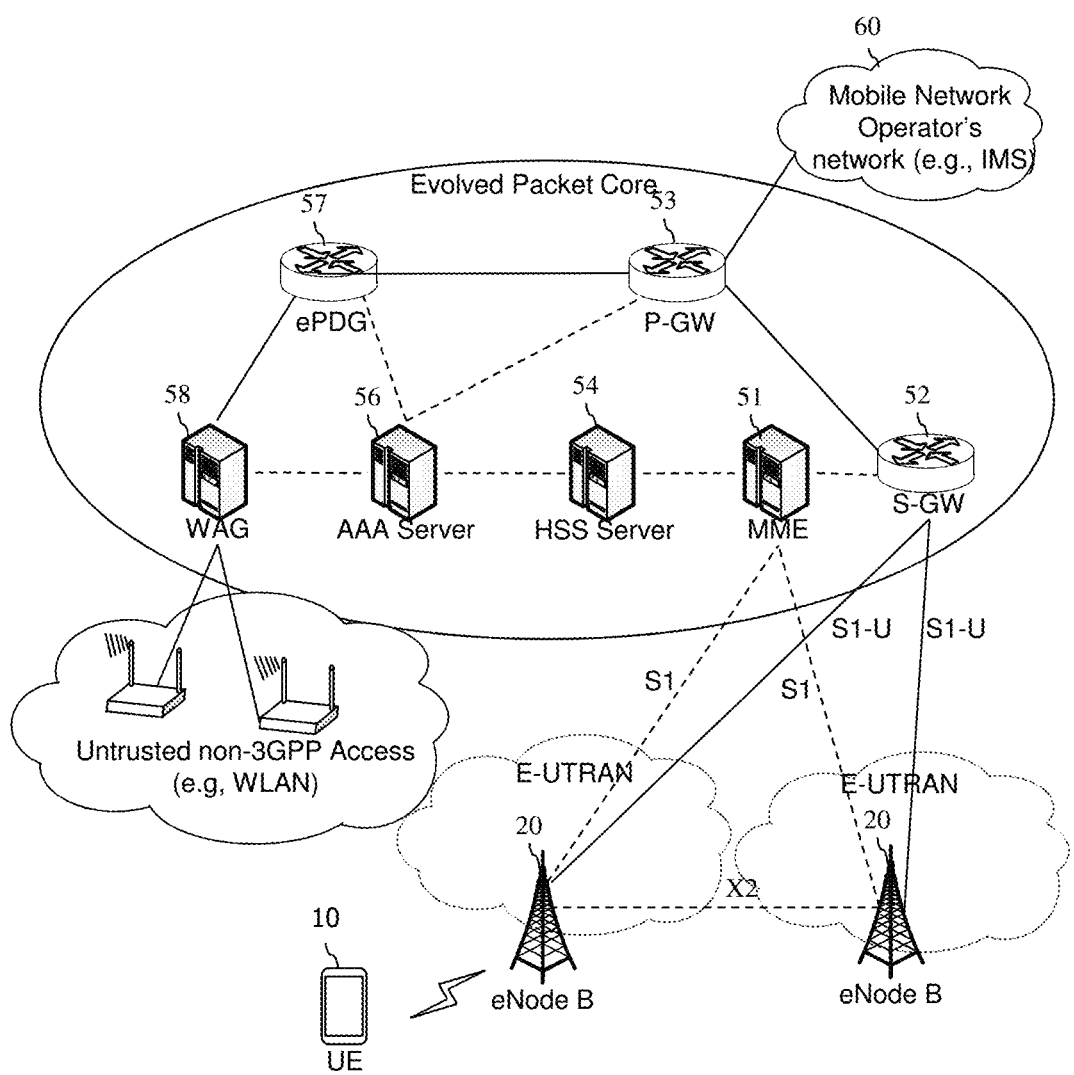
FIG. 1 shows the configuration of an evolved mobile communication network.
Figure 2:
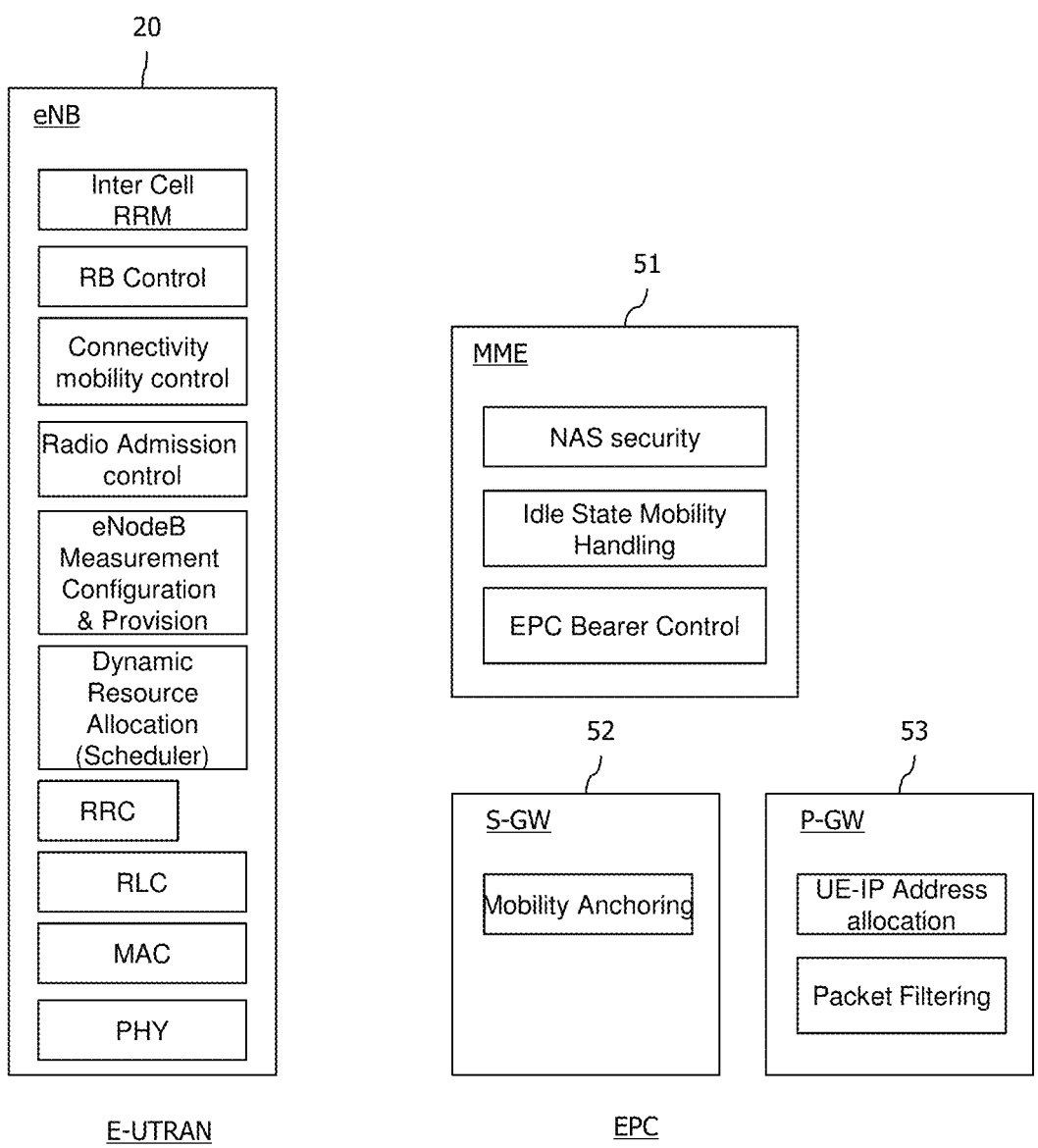
FIG. 2 is an exemplary diagram showing the architecture of a common E-UTRAN and a common EPC.
Figure 3:
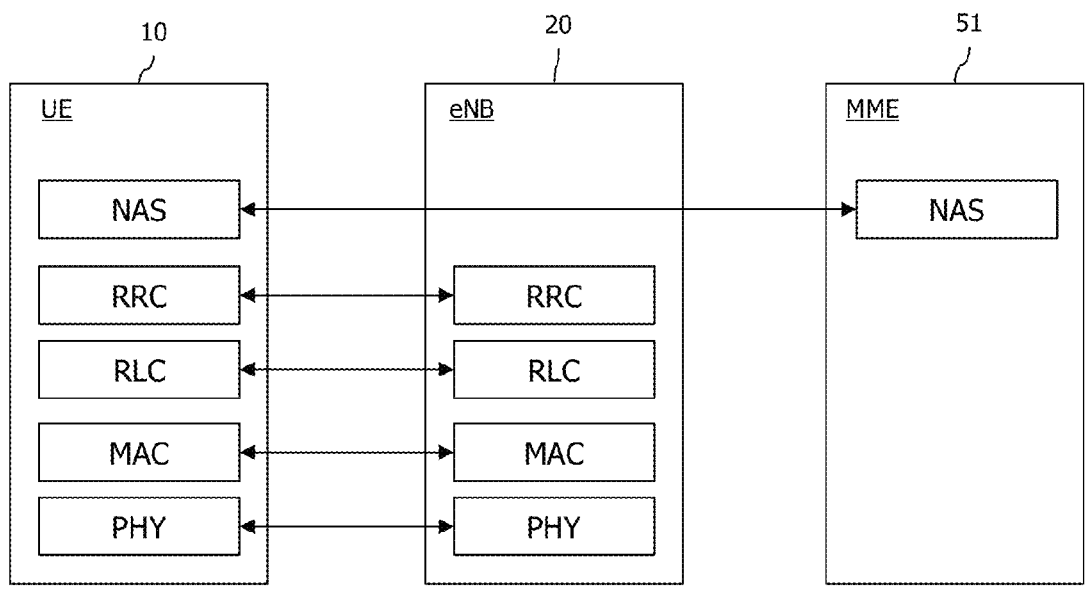
FIG. 3 is an exemplary diagram showing the structure of a radio interface protocol in a control plane between a UE and an eNodeB.
Figure 4:
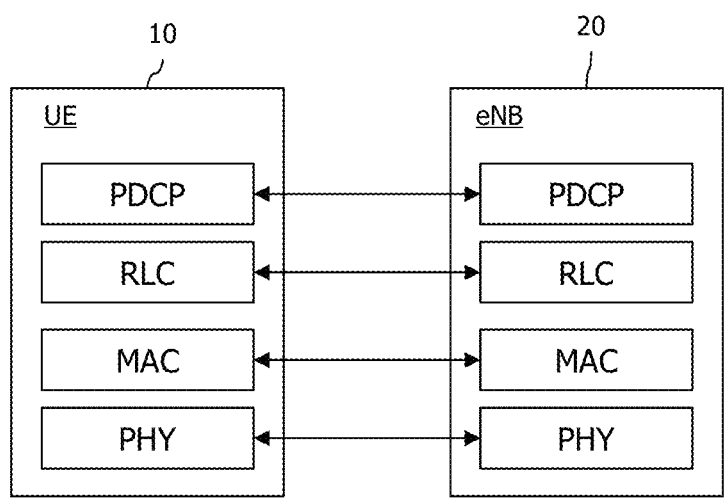
FIG. 4 is another exemplary diagram showing the structure of a radio interface protocol in a control plane between a UE and an eNodeB.
Figure 5:
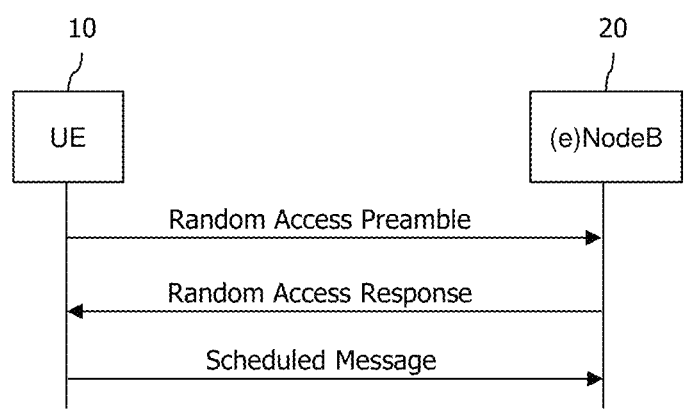
FIG. 5 is a flowchart illustrating a random access process in 3GPP LTE.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Proximity service (Proximity Service, ProSe Service or Proximity based Service): means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: means a rough distance range as a use for ProSe discovery, for example, a geographical distance range, and a distance range as a communication condition.

ProSe-enabled UE: means a UE supporting ProSe discovery, ProSe communication and/or ProSe-supported WLAN direct communication. In the present specification, the ProSe-enabled UE is also referred to as UE simply.

Announcing UE: a UE that notifies of information that can be used by adjacent UEs having discovery rights.

Monitoring UE: a UE that receives interested information from other adjacent UEs.

ProSe-enabled Network: means a network supporting ProSe discovery, ProSe communication and/or ProSe-supported WLAN direct communication. In the present specification, the ProSe-enabled Network is also referred to as network simply.

ProSe discovery: refers to a process of discovering a ProSe-enabled UE when it is closely located.

Open ProSe Discovery: means that it is possible to discover a ProSe-enabled UE without a direct permission when detecting it.

Restricted ProSe Discovery: means that it is possible to discover a ProSe-enabled UE only with a direct permission when detecting it.

ProSe Communication: means performing communication between UEs using an E-UTRAN communication path when a ProSe-enabled UE is closely located. A communication path may be established, for example, directly between UEs or via a local (or neighbor) eNodeB.

ProSe Group Communication: means performing one-to-all group communication using a common communication path established between two or more ProSe-enabled UEs when they are located adjacent to each other.

ProSe E-UTRA communication: means ProSe communication using an E-UTRA communication path.

ProSe-assisted WLAN direct communication: means ProSe communication using a WLAN direct communication path.

ProSe communication path: means a communication path supporting ProSe communication. A path of the ProSe E-UTRA communication can be established directly between ProSe-enabled UEs by using an E-UTRA or an eNodeB. A path of the ProSe-assisted WLAN direct communication can be established directly between the ProSe-enabled UEs via a WLAN.

EPC path (or infrastructure data path): mans a communication path of a user plane via EPC.

ProSe UE-to-network relay: means a relay which plays a role of a communication relay between a ProSe-enabled network and a ProSe-enabled UE.

ProSe UE-to-UE relay: means a relay which plays a role of a communication relay between ProSe-enabled UEs.

ISR (idle mode signaling reduction): means a scheme of reducing a waste of network resources caused by a repetitive location registration procedure when a UE frequently moves back and forth between an E-UTRAN and a UTRAN (or GERAN).

Meanwhile, following descriptions will be made with reference to the accompanying drawings.

Figure 6:
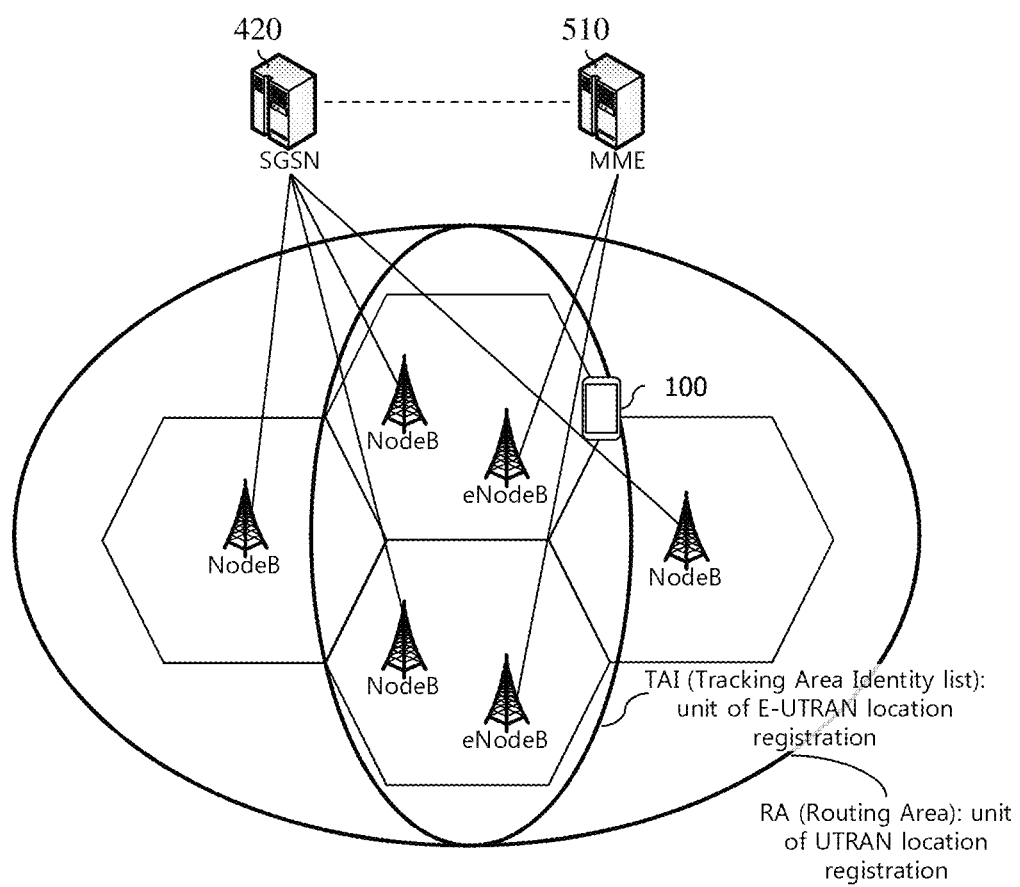
FIG. 6 shows a situation where a UTRAN and an E-UTRAN coexist.

FIG. 6 shows a situation where a UTRAN and an E-UTRAN coexist.

As can be seen from FIG. 6, an eNodeB of the E-UTRAN (i.e., a 4G radio access network) may be deployed in a region in which a NodeB of the UTRAN (i.e., a 3G radio access network) exists.

A tracking area identity (TAI) list illustrated herein indicates an area in which the E-UTRAN provides a service in unit of an E-UTRAN location registration, and includes a cell of one or a plurality of eNodeBs.

In addition, a routing area (RA) illustrated herein indicates an area in which the UTRAN provides a service in unit of a UTRAN location registration, and includes a cell of one or a plurality of NodeBs.

A UE 100 illustrated herein is located at a boundary of the E-UTRAN and the UTARN, and may camp on any one of them. Herein, the camp-on implies that the UE 100 accesses a cell after finishing a cell selection procedure or a cell reselection procedure. If the UE 100 camps on an E-UTRAN cell, a location registration to an MME 510 is performed, and if the UE 100 camps on a UTRAN cell, a location registration to a serving general packet radio service support node (SGSN) 420 is performed.

However, as illustrated, if the UE 100 is located in the boundary of the E-UTRAN and the UTRAN, an unexpected cell reselection procedure is repeated and thus a location registration procedure is continuously performed, which may result in a waste of network resources.

FIG. 7 is a flowchart illustrating an idle mode signalign reduction (ISR) for solving the problem of FIG. 6.

The ISR is a scheme for increasing efficiency of a network resource by reducing signaling for a location registration when a UE 100 moves back and forth between an E-UTRAN and a UTRAN. In the ISR scheme, if the UE 100 in an idle mode has moved back and forth one time between the E-UTRAN and the UTRAN and thus the location registration has been already achieved, the location registration may not be performed when the UE moves next time.

Detailed descriptions thereof are as follows.

Referring to FIG. 7, a UE 100 first camps on an E-UTRAN cell, and thus the UE 100 sends an attach request message to perform a location registration to an HSS 540 via an MME 510. The MME 510 sends an update location request message to report to the HSS 540 that the UE 100 is attached.

In this case, the HSS 540 stores an identity (ID) of the MME 510 to which the UE 100 is attached, and sends an update location ACK message containing subscriber information to the MME 510 as a response. The MME 510 sends an attach accept message to the UE 100. Accordingly, the UE 100 completes an attach procedure on the MME 510 of the E-UTRAN cell on which the UE 100 camps Thereafter, it is assumed that the UE 100 moves from the E-UTRAN cell to a coverage area of a UTRAN cell. In this case, the UE 100 reselects the UTRAN. Therefore, the UE 100 must register its location to the UTRAN by performing a routing area update (RAU) procedure.

Accordingly, the UE 100 sends an RAU request message to a serving general packet radio service support node (SGSN) 420 to perform a location registration to the HSS 540 via the SGSN 420. The SGSN 420 recognizes from the RAU request message that the UE 100 has previously performed the location registration to the MME 510. Therefore, the SGSN 420 sends a context request message to the MME 510 to acquire a context for the UE 100 from the MME 510 to which the UE 100 has performed the location registration.

In response to the context request message sent by the SGSN 420, the MME 510 sends a context response message containing the context for the UE 100 to the SGSN 420. In this case, the MME 510 inserts a parameter 'ISR capability' or 'ISR supported' into the context response message, and thus reports to the SGSN 420 that the MME 510 can support the ISR capability. Meanwhile, context information for the UE 100 and included in the context response message representatively includes UE's mobility management (MM) context information and EPS PDN connections information. Herein, the EPS PDN connections information includes bearer context information. The MME 510 sets the context information for the UE 100 and to be included in the context response message on the basis of the MM context and EPS bearer context information for the UE 100 and maintained in the MME 510.

The SGSN 420 determines whether the ISR will be activated for the UE 100. More specifically, the SGSN 420 may analyze or confirm the parameter 'ISR capability' or 'ISR supported' of the context response message received from the MME 510, and thus confirm that the MME 510 supports the ISR capability. In addition, since the SGSN 420 also supports the ISR capability, the SGSN 420 determines to activate the ISR.

The SGSN 420 determines the activation of the ISR capability. Therefore, the SGSN 420 sends a context ACK message to the MME 510 in response to the context response message sent by the MME 510. In this case, a parameter 'ISR activated' is inserted to the context ACK message so as to report to the MME 510 that the ISR capability is activated for the UE 100.

Meanwhile, if the ISR is activated, the SGSN 420 and the MME 510 store mutual identities (IDs). In addition, the MME 510 which has received the context ACK message including the parameter 'ISR activated' from the SGSN 420 continuously maintains the context for the UE 100.

The SGSN 420 sends an update location request message to the HSS 540 to report the location registration of the UE 100. In addition, the HSS 540 stores an ID of the SGSN 420 for which the UE 100 performs the RAU, and sends an update location ACK message containing subscriber information of the UE 100 to the SGSN 420 as a response.

The SGSN 420 sends an RAU accept message to the UE 100. In this case, a parameter 'ISR activated' is inserted to the RAU accept message so as to report that the ISR capability is activated for the UE 100.

It is described above that the location of the UE is registered through the attach procedure and the RAU procedure. Further, the MME 510 and the SGSN 420 support the ISR capability, and thus the ISR is activated.

Therefore, even if the UE 100 moves again from the UTRAN to the E-UTRAN and thus the E-UTRAN cell is reselected, the UE 100 does not have to perform the location registration to the MME 510 since the ISR is currently activated.

That is, after the ISR is activated, the location registration to the network is not necessarily performed again as long as the UE 100 is within a routing area (RA) registered through the SGSN 420 and a tracking area identity (TAI) list registered through the MME 510. This capability is the ISR. Meanwhile, the RA registered through the SGSN 420 and the TAI list registered through the MME 510 are referred to together as an ISR area. As described above, if the UE frequently moves between the E-UTRAN and the UTRAN/GERAN, the ISR capability can reduce a waste of network resources by avoiding a repetitive location registration procedure.

Figure 8A:
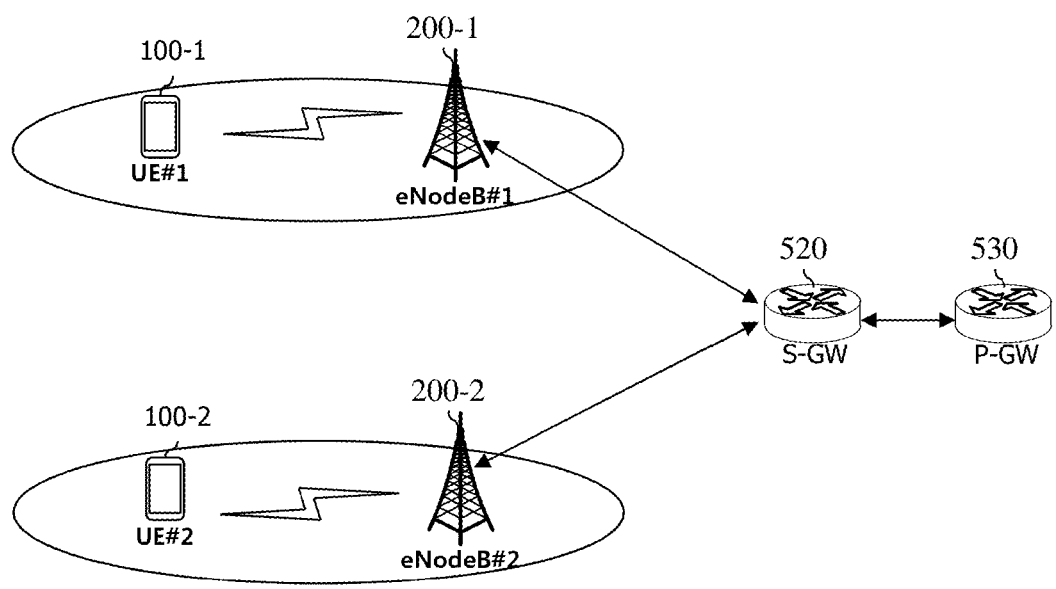
FIG. 8a shows an example of a typical communication.

FIG. 8*a* shows an example of a typical communication.

Referring to FIG. 8*a*, a UE#1 100-1 exists within a coverage of an eNodeB#1 200-1, and a UE#2 100-2 exists within a coverage of an eNodeB#2 200-2. Communication between the UE#1 100-1 and the UE#2 100-2 may be performed via a core network, for example, an S-GW 520/P-GW 530. As such, a communication path which passes through the core network may be called an infrastructure data path. In addition, communication performed via the infrastructure data path is called infrastructure communication.

Figure 8B:
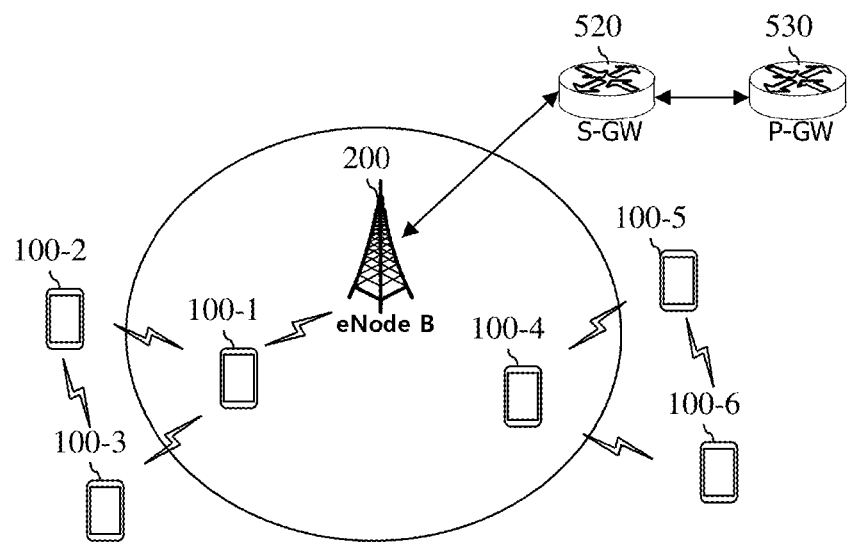
FIG. 8b shows the concept of proximity communication expected to be employed in a next-generation communication system.

FIG. 8*b* shows the concept of proximity communication expected to be employed in a next-generation communication system.

An increase in a user requirement for a social network service (SNS) results in the arising of a demand for a discovery between physically adjacent UEs and special applications/services, i.e., proximity-based application/services. Therefore, there is a growing increase in a demand for proximity communication between UEs.

In order to apply the aforementioned requirement, as illustrated in FIG. 8*b*, there is an ongoing discussion on a method capable of performing a directly communication among a UE#1 100-1, a UE#2 100-2, and a UE#3 100-3 or among a UE#4 100-4, a UE#5 100-5, and a UE#6 100-6 without an intervention of an eNodeB 200. Of course, communication may be achieved directly between the UE#1 100-1 and the UE#4 100-4 with the assistance of the eNodeB 200. Meanwhile, the UE#1 100-1 may play a role of a relay for the UE#2 100-2 and the UE#3 100-3 located far from a cell center. Likewise, the UE#4 100-4 may play a role of a relay for the UE#5 100-5 and the UE#6 100-6 located far from the cell center.

As described above, there is an ongoing discussion that the next-generation system will employ proximity communication between UEs.

Figure 9A:
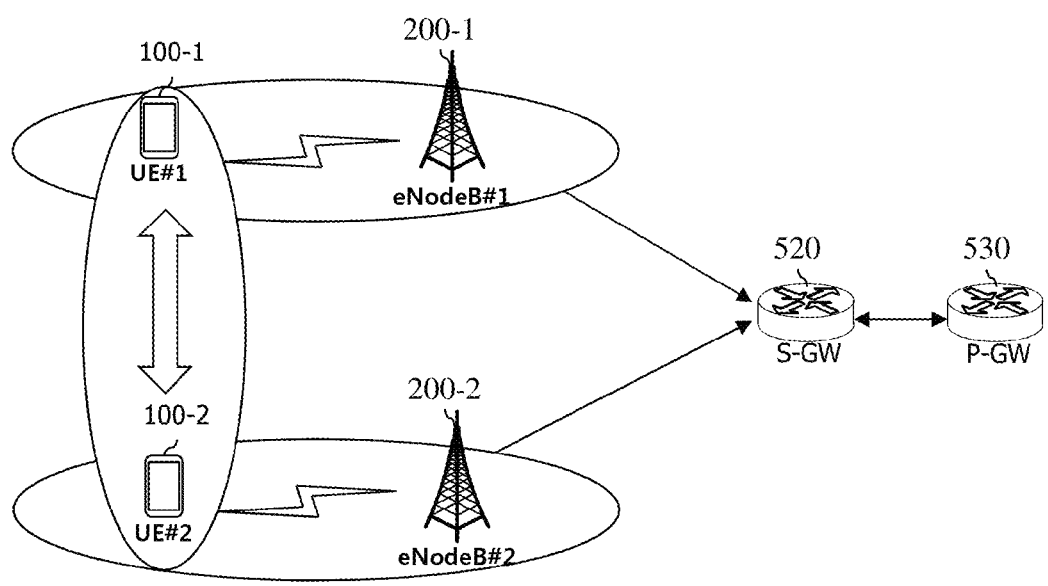
FIG. 9a is an exemplary diagram showing an example of proximity communication.
Figure 9B:
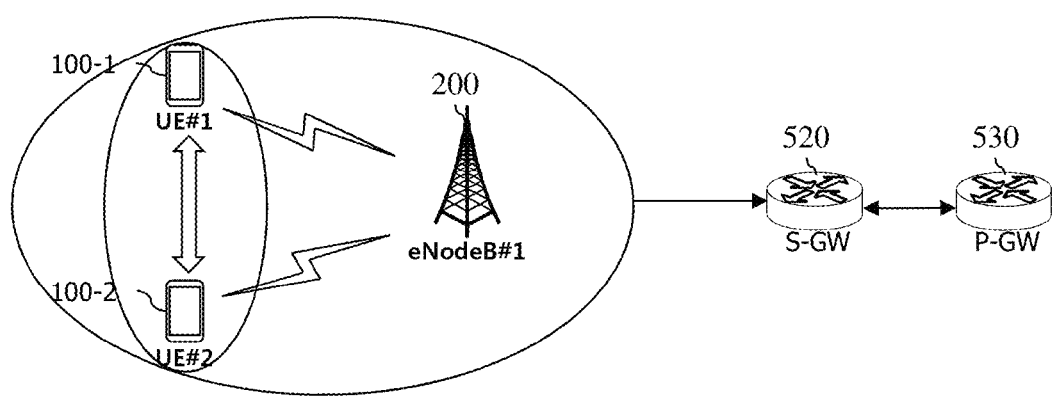
FIG. 9b is an exemplary diagram showing another example of proximity communication.

FIG. 9*a* is an exemplary diagram showing an example of proximity communication, and FIG. 9*b* is an exemplary diagram showing another example of proximity communication.

Referring to FIG. 9*a*, there is illustrated a situation that a UE#1 100-1 and a UE#2 100-2 perform proximity communication through a direct communication path while camping on different eNodeBs, respectively. Referring to FIG. 9*b*, there is shown a situation that a UE#1 100-1 and a UE#2 100-2 perform proximity communication through a direct communication path while camping on an eNodeB 200, respectively.

As such, the UE#1 100-1 and the UE#2 100-2 may perform proximity communication through a direct communication path bypassing a path through an eNodeB and a core network that a service provider operates.

The term, direct communication path, may be variously referred to as data path for proximity service, data path based on proximity service or proximity service communication path. Furthermore, communication through the direct communication path may be variously called direct communication, proximity service communication or proximity service-based communication.

Figure 10:
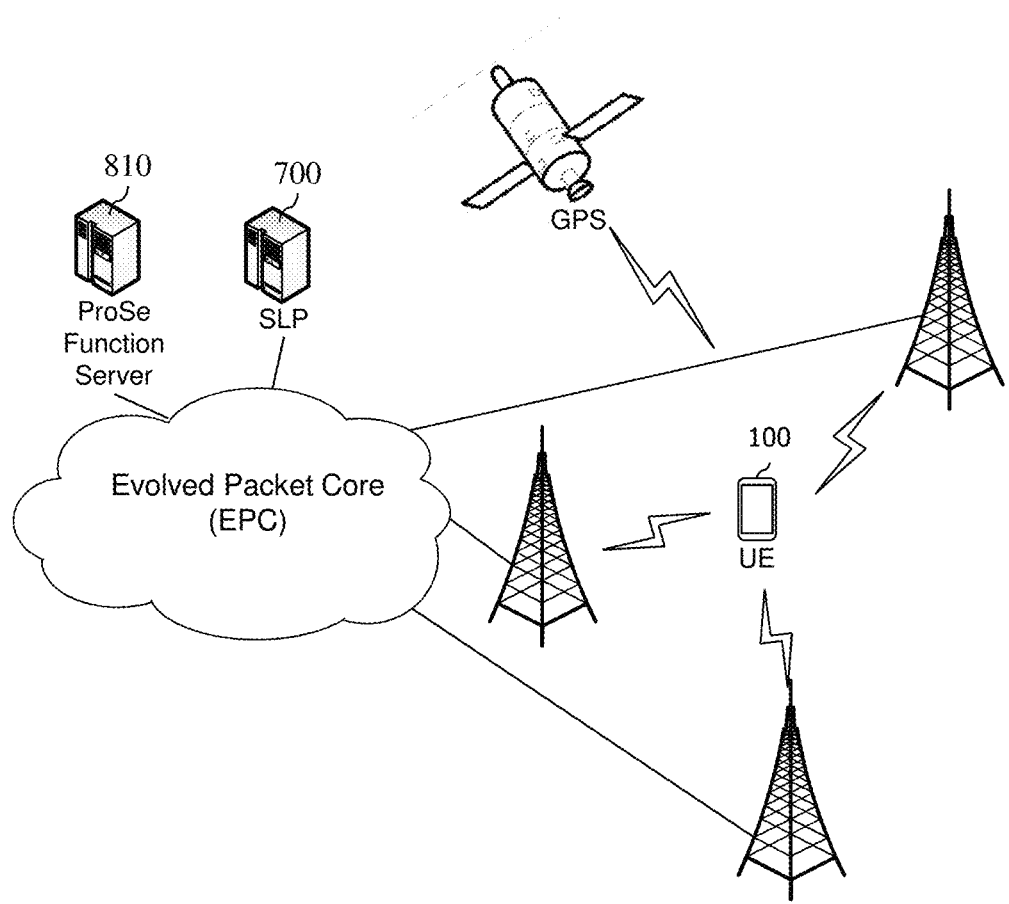
FIG. 10 shows an example of using a secure user plane location (SUPL) service for a ProSe discovery.

FIG. 10 shows an example of using a secure user plane location (SUPL) service for a ProSe discovery.

The SUPL service is a service for providing a location service through a user plane. A location of a UE 100 is calculated by using triangulation through a plurality of eNodeBs or GPS-assisted triangulation. An SUPL location platform (SLP) 700 illustrated herein accesses an EPC to acquire location information of the UE 100 from the eNodeB or to acquire a GPS-based location from the UE 100, and plays a role of delivering the acquired location information to a requester. Hereinafter, a ProSe discovery procedure using the SUPL service will be described in greater detail with reference to FIG. 11.

Figure 11:
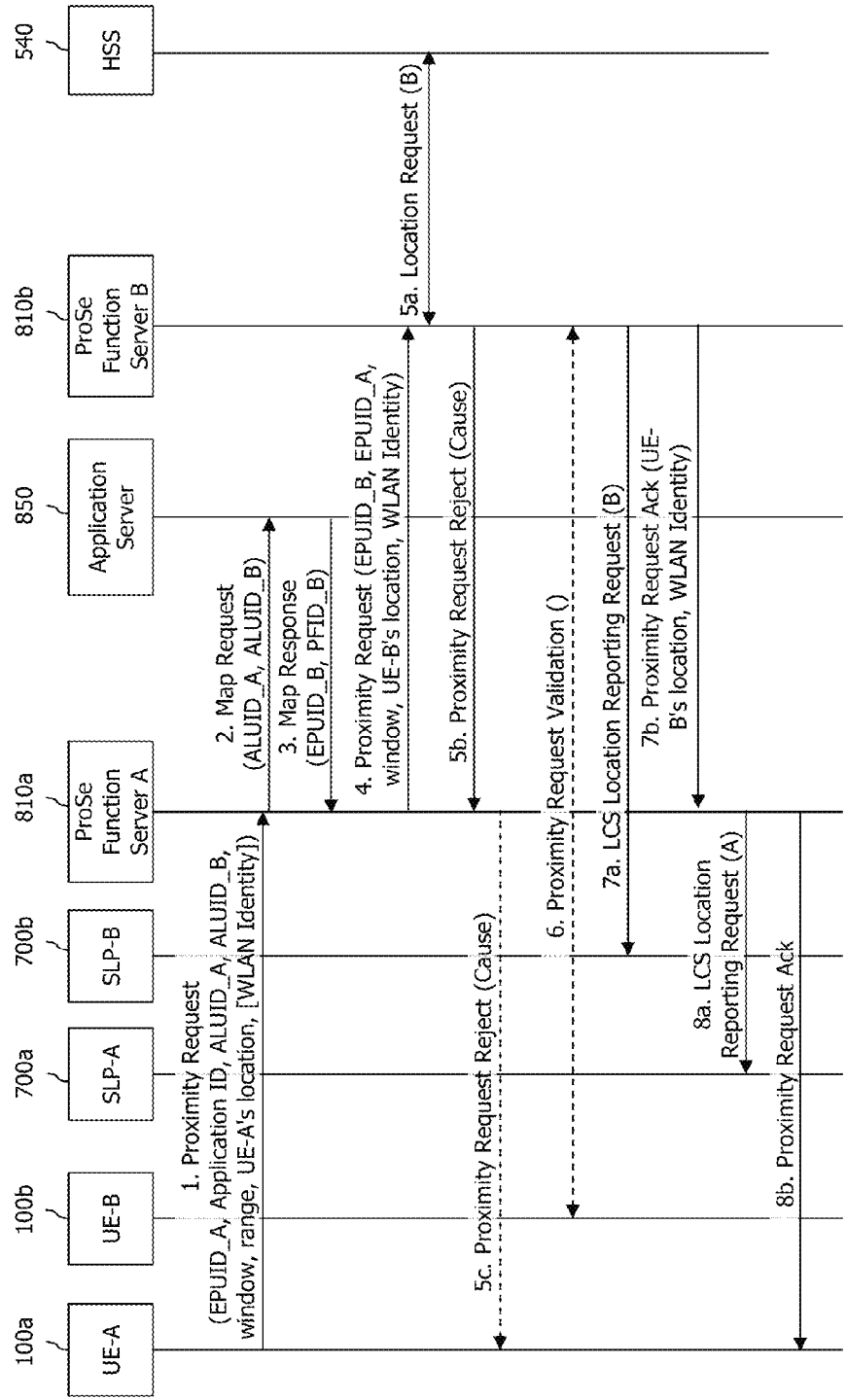
FIG. 11 shows a ProSe discovery procedure using an SUPL service.

FIG. 11 shows a ProSe discovery procedure using a secure user plane location (SUPL) service.

Referring to FIG. 11, it is shown a procedure in which a UE-A 100*a* discovers a UE-B 100*b* by the aid of a network, that is, by using the SUPL service.

(1) First, the UE-A 100*a* transmits a proximity request to a ProSe function server A 810*a*. The proximity request may include an EPUID_A, an application ID, an ALUID_A, an ALUID_B, a window, a range, and location information of the UE-A 100. In addition, the proximity request may selectively include a WLAN ID. The application ID identifies an application platform server. The ALUID_A and the ALUID_B are IDs for identifying the UE-A 100*a* and the UE-B 100*b*, respectively. The window implies a time duration in which the proximity request is valid. The range indicates a range class requested for the application among allowed range class sets. The location information indicates a UE location known to the UE-A 100A. The WLAN ID may be included when the UE-A 100A selectively requests a WLAN direct discovery.

(2) The ProSe function server A 810*a* transmits a MAP request to an application server 850 to acquire a ProSe subscriber ID of the UE-B 100*b*. The MAP request includes the ALUID_A and the ALUID_B. In this case, the ProSe function server A 810*a* stores IDs of the UE-A 100*a* and the UE-B 100*b* in the application, i.e., the ALUID_A and the ALUID_B, for a duration indicated in the window.

(3) The application server 850 confirms whether ProSe is allowed in the application of the UE-B 100b, confirms whether the UE-B 100b allows the UE-A 100a to discover the UE-B 100b, and thereafter transmits a MAP response to the ProSe function server A 810a. The MAP response includes an EPC ProSe subscriber ID of the UE-B 100b (i.e., EPUIC_B) of the UE-B 100b and an ID of a ProSe function server B 810b (i.e., PFID_B). Then, the ProSe function server A 810a stores the EPUID_B and the PFID_B.

(4) The ProSe function server A 810a delivers a proximity request to the ProSe function server B 810b in order to request a periodic update of a location. The proximity request may include the EPUIC_B, the EPUIC_A, the window, and the location information of the UE-A 100a. Alternatively, the proximity request may include the WLAN ID.

(5) The ProSe function server B 810b confirms a record of the UE-B 100b on the basis of the EPUID_B. That is, the ProSe function server B 810b may request an HSS 540 to provide information regarding a last location of the UE-B 100b. The ProSe function server B 810b may determine whether it is in proximity to the UE-A 100a and the UE-B 100b on the basis of the location of the UE-B 100b and the location of the UE-A 100a. If it is confirmed that it is not in proximity to the UE-A 100a and the UE-B 100b for the duration indicated in the window, the ProSe function server B 810b may transmit a proximity request reject message to the ProSe function server A 810a in order to reject the proximity request. In response thereto, the ProSe function server A 810a may deliver the proximity request reject message to the UE-A 100a.

(6) Meanwhile, according to a ProSe configuration (or profile) of the UE-B 100b, the UE-B 100b may receive a confirmation request as to whether to accept the proximity request.

(7) The ProSe function server B 810b transmits an LCS location reporting request message of the UE-B 100b to an SLP-B 700b. In addition, the ProSe function server B 810b transmits a proximity request ACK message to the ProSe function server A 810a. The proximity request ACK message may include a location of the UE-B. The proximity request ACK message may further include a WLAN ID of the UE-B.

(8) The ProSe function server A 810a transmits an LCS location reporting request message of the UE-A 100a to an SPL-A 700a. If it is confirmed that it is not in proximity to the UE-A 100a and the UE-B 100b for the duration indicated in the window, the ProSe function server A 810a may determine whether to cancel the proximity request. Otherwise, the ProSe function server A 810a transmits the proximity request ACK message to the UE-A 100a.

As described above, the ProSe discovery may use the SUPL service. However, if the ISR described with reference to FIG. 7 is activated, the UE-B 100b does not perform RAU or TAU, and thus the HSS 540 cannot know information regarding a correct last location of the UE-B 100b. Therefore, there is a problem in that the ProSe function server B 810b cannot correctly determine whether it is in proximity to the UE-A 100a and the UE-B 100b.

This problem will be described in greater detail as follows. In case of a network-assisted discovery, i.e., an EPC-level ProSe discovery, there is a need to acquire information regarding a recent location of the UE-B 100b which is a target of the discovery from a network, for example, the HSS 540. However, if the ISR is applied, since the UE-B 100b which is the target of the discovery does not perform the RAU or the TAU, the network, i.e., the HSS 540, does not have information indicating whether the UE-B 100b is currently in the E-UTRAN or in the UTRAN/GERAN.

In particular, returning to FIG. 7, if the update location request message is received from the MME 510 or the SGSN 420 according to the TAU/RAU, the HSS 540 simply registers the MME 510 and the SGSN 420, and has information as shown in Table 2 below. That is, whether the UE-B 100b is currently in the E-UTRAN or in the UTRAN/GERAN can be known on the basis of the information shown in Table 2.

TABLE 2

| MME Identity | An identity of an MME serving a UE-B |
| SGSN Address | An address of an SGSN serving a UE-B |

However, if the ISR is applied and thus the UE-B 100b does not perform the RAU/TAU, eventually, whether the UE-B 100b is currently in the E-UTRAN or in the UTRAN/GERAN cannot be correctly known. That is, it is difficult for the HSS 540 to determine whether the UE-B 100b is in an E-UTRAN coverage in which a ProSe service is currently available (i.e., a TAU area served by the MME) or is out of the coverage (i.e., a UTRAN/GERAN RAU/LAU area served by the SGSN, and in a normal case, a range of an area served by the SGSN is wide, and there may be a range overlapping with the TAU area and a range not overlapping therewith). In general, the HSS 540 may have a MAP of an operator's network mapped to an MME ID/SGSN address, and may use corresponding information to roughly estimate a proximity between the UE-A 100a and the UE-B 100b which have transmitted a proximity request. However, if the ISR is activated, in which area the UE-B 100b is currently located cannot be known, and thus it is difficult to estimate the proximity.

Accordingly, disclosures of the present specification propose methods for solving the aforementioned problem.

Brief Description on Disclosures of the Present Specification

The disclosures of the present specification proposes methods for effectively performing a discovery for a proximity service in a mobile communication system such as a 3GPP evolved packet system (EPS).

Specifically, the disclosure of the present specification proposes methods for allowing an ISR not to be activated for a proximity service or for deactivating an activated ISR.

First, the methods for allowing the ISR not to be activated for the proximity service will be described as follows. According to a first example of the first method, when determining whether a network node, e.g., an MME, will activate the ISR, it is determined by using a parameter related to the proximity service. According to a second example of the first method, in order to prevent the ISR from being activated between network nodes, mutually manipulated information (i.e., even if an ISR capability is present, it is manipulated as being not present) is exchanged. In the determining of whether network nodes will manipulate the information, the parameter related to the proximity service may be used.

Second, the method of deactivating the activated ISR will be described as follows. According to a first example of the second method, a network node may actively instruct a UE to deactivate the activated ISR. According to a second example of the second method, each of network nodes may deactivate the ISR and thereafter may exchange information thereon. According to a third example of the second method, it may be mutually requested to deactivate the ISR between the network nodes.

Hereinafter, disclosures of the present specification will be described with reference to the accompanying drawings.

Figure 12:
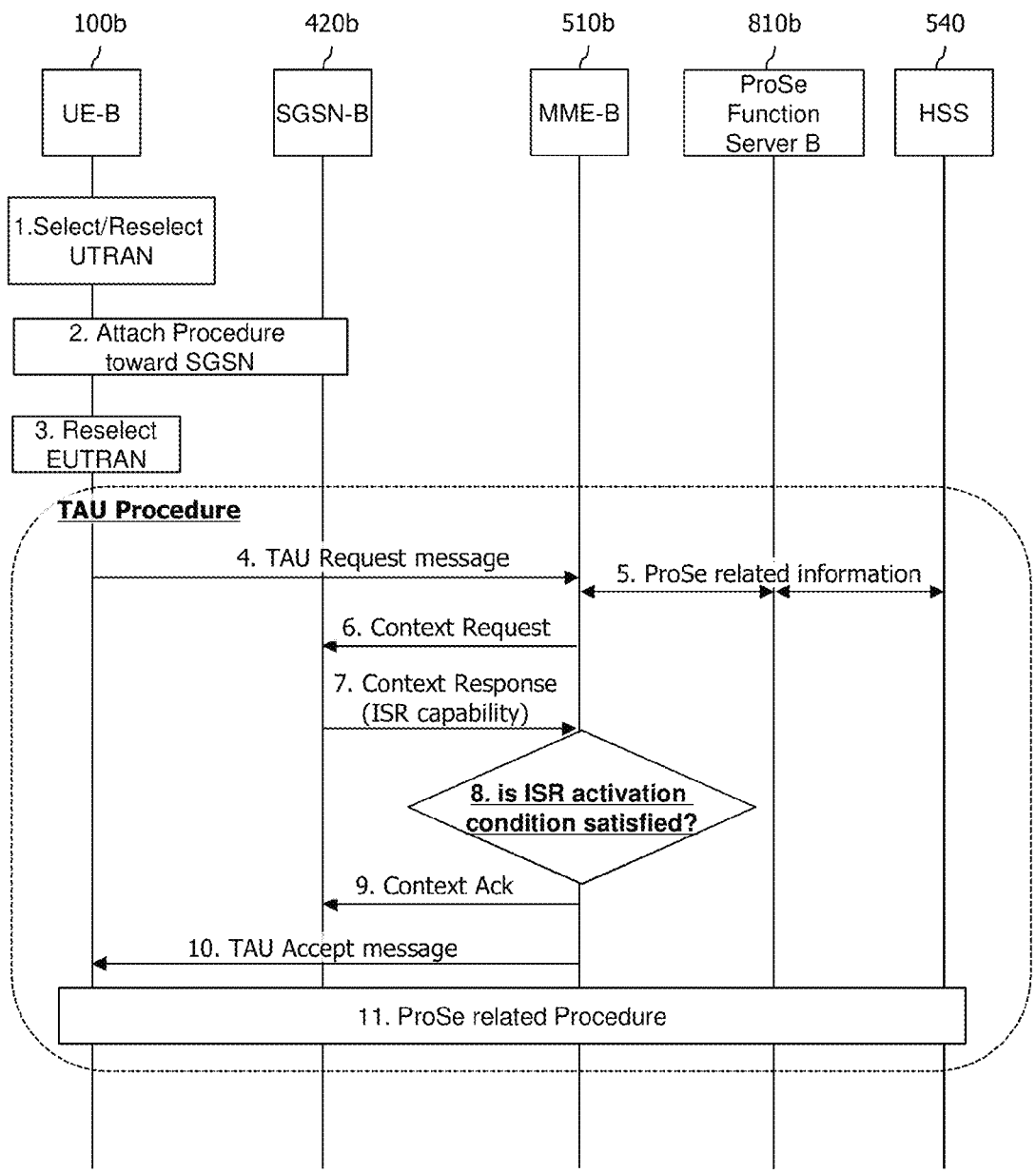
FIG. 12 is a flowchart illustrating a solution according to a first example of a first method.

FIG. 12 is a flowchart illustrating a solution according to a first example of a first method.

A method shown in FIG. 12 is a method in which a parameter related to a proximity service is used when determining whether the network node, e.g., the MME, will activate an ISR according to the first example of the first method described above. Detailed descriptions thereof are as follows.

(1)~(2) A UE-B 100b selects a UTRAN and performs an attach procedure with respect to an SGSN-B 420b.

(3)~(4) If the UE-B 100b selects an EUTRAN, the UE-B 100b transmits a TAU request message to an MME-B 510b serving the UE-B 100b.

(5) Then, the MME-B 510b acquires ProSe related information. The ProSe related information may include information regarding whether the UE-B 100b has a ProSe capability and information regarding whether the UE-B 100b enables the ProSe service. Alternatively, the ProSe related information may include information regarding whether an EPC-level ProSe discovery can be used.

The information regarding the EPC-level ProSe discovery may include information regarding whether the UE-B 100b is a UE of a subscriber capable of using the network-assisted discovery service and information regarding whether a specific service is in a state in which the network-assisted discovery service is allowed for use.

The ProSe related information may be acquired from an HSS 540 or a ProSe function server B 810b by using the following methods.

First, when the ProSe related information is stored in subscriber information, the MME-B 510b may acquire it from the HSS 540.

Second, when the UE-B 100b is registered to the ProSe function server B 810b, or delivers the ProSe related information during a process of registering an application thereof, the MME-B 510b may acquire corresponding information from the ProSe function server B 810b. In this case, information regarding whether the EPC-level ProSe discovery can be used may be included in the ProSe related information.

Third, when the UE-B 100b is registered to the ProSe function server B 810b, or delivers the ProSe related information during the process of registering the application thereof and when the ProSe function server B 810 delivers the information of the HSS 540, the MME-B 510b may acquire corresponding information from the HSS 540.

(6) Then, the MME-B 510b transmits a context request message to the SGSN-B 420b in order to acquire a context for the UE-B 100b.

(7) Upon receiving the context request message, the SGSN-B 420b transmits a context response message including information regarding an ISR capability thereof to the MME-B 510b.

(8) The MME-B 510b determines whether to activate the ISR. Specifically, the MME-B 510b determines whether the conventional ISR activation condition is satisfied, and at the same time, the MME-B 510b confirms whether the UE-B 100b is in a state capable of performing the ProSe related service or is scheduled to perform the service. Whether the conventional ISR activation condition is satisfied may be determined according to whether both of the SGSN-B 420b and the MME-B 510b have the ISR capability. In addition, whether the conventional ISR activation condition is satisfied may be determined by additionally considering whether the SGSN-B 420b has a context of the UE-B 100b.

The confirmation regarding whether the UE-B 100b is in the state capable of performing the ProSe related service or is scheduled to perform the service may be performed by using the previously acquired ProSe capability information of the UE-B 100b and enable state information of the ProSe service. Herein, although the ProSe capability information of the UE-B 100b may be acquired from the HSS, if the UE-B 100b has previously transmitted an attach request message to the MME-B 510b, it may be acquired from the attach request message. If the ProSe capability information is included in the attach request message, the MME-B 510b may have transmitted an attach request accept message by inserting a ProSe authorized indicator in response to the attach request message.

In addition, the confirmation may be performed by additionally using the previously acquired information regarding whether the EPC-level ProSe discovery can be used. The information regarding the EPC-level ProSe discovery may include information regarding whether the UE-B 100b is a UE of a subscriber capable of using the network-assisted discovery service and information regarding whether a specific service is in a state in which the network-assisted discovery service is allowed for use.

Further, in the confirmation, information regarding whether the MME-B 510b supports a ProSe service or a ProSe enabled UE may be additionally used. In addition, in the confirmation, information which is predetermined in the MME-B 510b may also be used. The predetermined information may be, for example, information instructing the ProSe enabled UE not to activate the ISR even if the MME-B 510b has a capability of supporting the ISR.

According to the confirmation, if the UE-B 100b is in the state capable of performing the ProSe related service or is scheduled to perform the service, the MME-B 510b may determine not to activate the ISR.

(9) The MME-B 510b transmits a context ACK message to the SGSN-B 420b. In this case, the context ACK message may set a value of an ISRAI flag shown in Table 6 below to 0.

(10) Subsequently, the MME-B 510b transmits a TAU accept message in response to the TAU request message by inserting an indicator indicating that the ISR is not activated or an indicator indicating that the ISR shall be not activated.

(11) Since the ISR is not activated, the ProSe related procedure can be effectively performed.

The TAU accept message includes information elements shown in Table 3 below.

An information element 'EPS update result' of Table 3 is set to '100' indicating 'TA updated and ISR activated' when the ISR is activated, whereas when the MME-B 510b determines not to activate the ISR as described above, is set to 0000 indicating 'TA updated' as shown in Table 4.

TABLE 3

| Information element (IE) | Type |
| --- | --- |
| Protocol discriminator | Protocol discriminator |
| Security header type | Security header type |
| Tracking area update accept message identity | Message type |
| EPS update result | EPS update result |
| GUTI | EPS mobile identity |
| TAI list | List for TAI (Tracking area identity) |
| EPS bearer context status | EPS bearer context status |

TABLE 3-continued

| Information element (IE) | Type |
| --- | --- |
| Location area identification | Location area identification |
| MS identity | Mobile identity |
| EMM cause | EMM cause |
| T3402 value | GPRS timer |
| T3423 value | GPRS timer |
| Equivalent PLMNs | PLMN list |
| Emergency number list | Emergency number list |
| EPS network feature support | EPS network feature support |
| Additional update result | Additional update result |

TABLE 4

| Value (3 bits) of EPC update result | | | |
| --- | --- | --- | --- |
| 0 | 0 | 0 | TA updated |
| 0 | 0 | 1 | combined TA/LA updated |
| 1 | 0 | 0 | TA updated and ISR activated |
| 1 | 0 | 1 | combined TA/LA updated and ISR activated |

Not all of the procedures described up to now with reference to FIG. 12 are necessarily performed, and only some steps thereof may be performed optionally.

Figure 13:
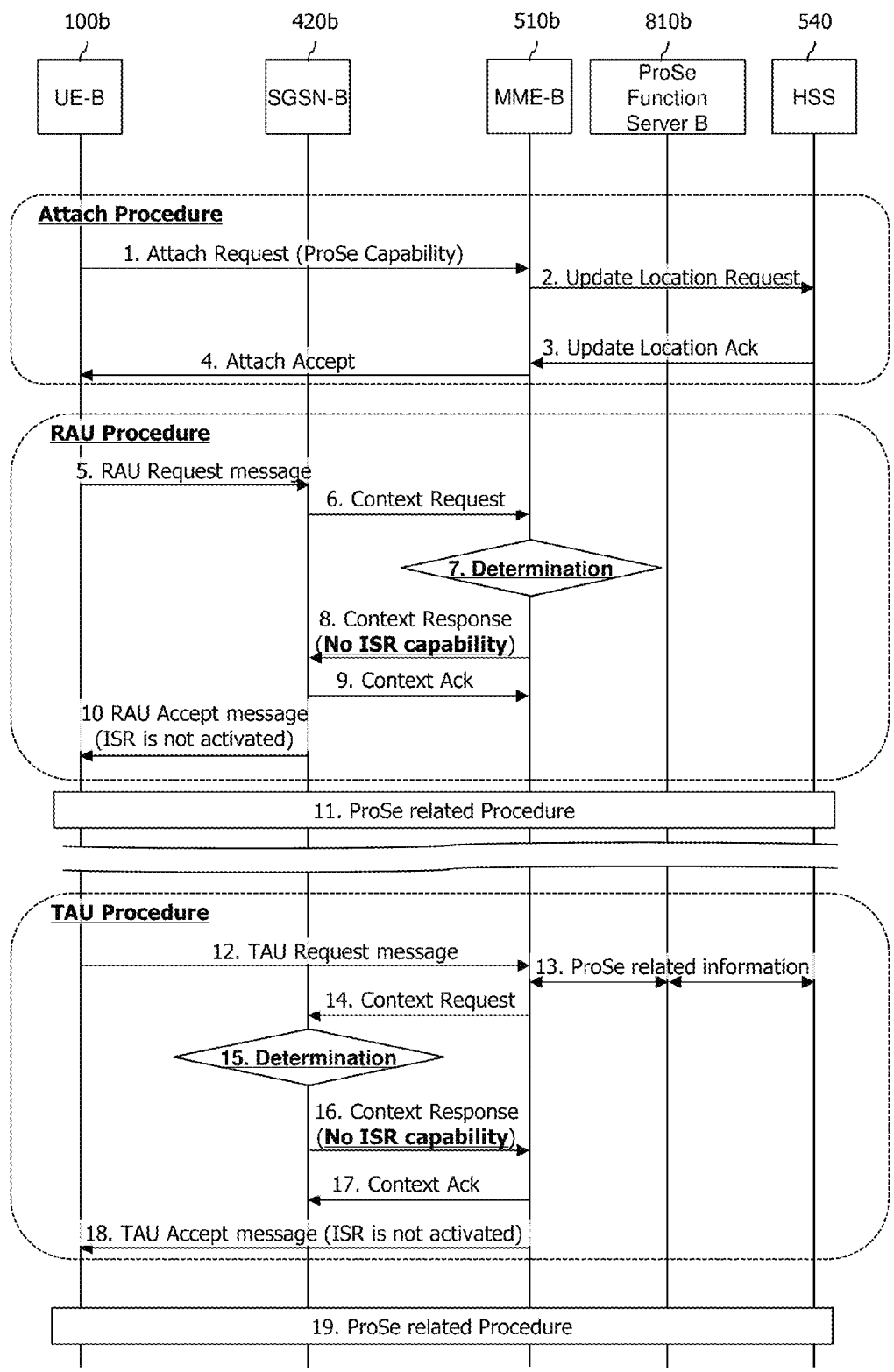
FIG. 13 is a flowchart illustrating a solution according to a second example of a first method.

FIG. 13 is a flowchart illustrating a solution according to a second example of a first method.

A method shown in FIG. 13 is a method of exchanging mutually manipulated information (i.e., even if an ISR capability is present, it is manipulated as being not present) in order to prevent the ISR from being activated between network nodes. Detailed descriptions thereof are as follows.

(1)~(4) A UE-B 100b selects an EUTRAN, and performs an attach procedure with respect to an MME-B 510b serving the UE-B 100b. Specifically, the UE-B 100b transmits an attach request message to the MME-B 510b. ProSe capability information may be included in the attach request message.

(5) Thereafter, if the UE-B 100b reselects a UTRAN, the UE-B 100b transmits an RAU request message to the SGSN-B 420b serving the UE-B 100b.

(6) Then, the SGSN-B 420b transmits a context request message to the MME-B 510b to acquire a context for the UE-B 100b.

(7) Upon reception of the context request message, the MME-B 510b determines how to insert ISR capability related information into a context response message. Conventionally, if the MME-B 510b has the ISR capability, a flag 'Idle mode Signalling Reduction Supported Indication' is set to 1 among indication flags in a context response message shown in Table 5 below. However, according to the first example of the aforementioned first method, even if the MME-B 510b has the ISR capability, whether to set the flag to 0 or 1 may be determined.

Whether to set the flag to 0 or 1 may be determined by using one or more of the following information.

First, it may be determined by the MME-B 510b on the basis of information regarding whether the UE-B 100b is in a state capable of using the EPC-level ProSe discovery. The information regarding the EPC-level ProSe discovery may include information regarding whether the UE-B 100b is a UE of a subscriber capable of using the network-assisted discovery service and information regarding whether a specific service is in a state in which the network-assisted discovery service is allowed for use.

Second, it may be determined by the MME-B 510b on the basis of information predetermined for a ProSe service/ProSe-enabled UE.

Third, it may be determined by the MME-B 510b on the basis of ProSe capability information of the UE-B 100b and enable state information of a ProSe service.

(8) The MME-B 510b transmits a context response message in which a flag 'Idle mode Signalling Reduction Supported Indication' is set to 0 (i.e., No ISR capability) to the SGSN-B 420b according to the determination.

(9) The SGSN-B 420b transmits a context ACK message to the MME-B 510b. In this case, a value of an ISRAI flag shown in Table 6 below is set to 0 in the context ACK message.

(10) In addition, the SGSN-B 420b knows that the MME-B 510b does not have the ISR capability from the context ACK message, and thus transmits to the UE-B 100b an RAU accept message including an indicator indicating that the ISR is not activated.

(11) As such, since the ISR is not activated, the ProSe related procedure can be effectively performed.

TABLE 5

| IE | Description |
| --- | --- |
| IMSI | International Mobile Subscriber Identity |
| MME/SGSN UE MM Context | It is included when a cause IE is set to a value indicating "Request Accepted". |
| MME/SGSN UE EPS PDN Connections | It is included when at least one PDN connection for a UE exists. |
| Sender F-TEID for Control Plane | It is included when the cause IE is set to the value indicating "Request Accepted". |
| SGW node name | Identifier of an S-GW used by an old MME/SGSN. |
| Indication Flags | It is included when any one of the following flags is set to 1.<br>Idle mode Signalling Reduction Supported Indication: It is included when the old MME/SGSN has ISR capability.<br>ISRAU: It is set to 1 when the ISR is activated before the UE moves to a new SGSN/MME. |

TABLE 6

| IE | Condition/Description |
| --- | --- |
| Cause | |
| Indication flags | It is included when any one of the following flags is set to 1.<br>SGWCI: An indicator indicating that an SGW is changed, when a new S-GW is selected.<br>ISRAI: It is set to 1 when an ISR is activated |

TABLE 6-continued

| IE | Condition/Description |
|---|---|
| | and an old SGSN/MME is instructed to maintain a UE context. |

(12)~(18) On the other hand, when the UE-B 100*b* reselects the EUTRAN again, a TAU procedure is performed with respect to the MME-B 100*b*. In the TAU procedure, similarly to the previous RAU procedure, mutually manipulated information (i.e., even if an ISR capability is present, it is manipulated as being not present) is exchanged to prevent the ISR activation.

As such, since the ISR is not activated, the ProSe related procedure can be effectively performed.

Not all of the procedures described up to now with reference to FIG. 13 are necessarily performed, and only some steps thereof may be performed optionally.

Meanwhile, the second method described above in brief will be described hereinafter.

Figure 14:
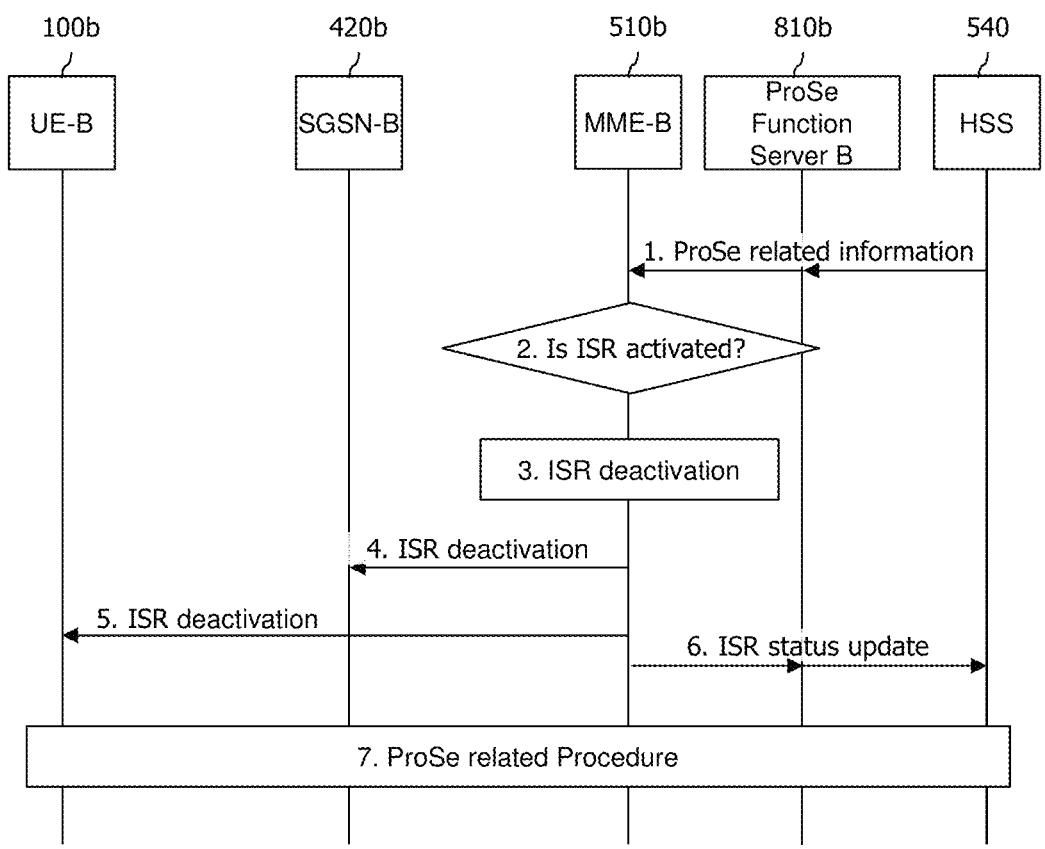
FIG. 14 is a flowchart illustrating a solution according to a first example of a second method.

FIG. 14 is a flowchart illustrating a solution according to a first example of a second method.

The second method is for deactivating a previously activated ISR for a proximity service as described above. It is described above that, according to the first example of the second method, a network node may actively instruct a UE to deactivate the activated ISR. Further, according to a second example of the second method, each of network nodes may deactivate the ISR and thereafter may exchange information thereon. According to the third example of the second method, it may be mutually requested to deactivate the ISR between the network nodes.

Hereinafter, the first example of the second method will be described with reference to FIG. 14.

(1) An MME-B 100*b* serving a UE-B 100*b* acquires the ProSe related information. As described above, the ProSe related information may be acquired from an HSS 540 or a ProSe function server B 810*b*. The description of FIG. 12 is applied herein.

(2) The MME-B 100*b* determines whether an ISR is activated. If it is confirmed that the ISR is activated but it is confirmed that a ProSe related service can be performed or is scheduled to be performed on the basis of the acquired ProSe related information, the MME-B 100*b* determines whether to deactivate the ISR.

(3)~(4) The MME-B 100*b* deactivates the ISR activated for the MME-B 100*b* and thereafter requests an SGSN-B 420*b* to deactivate the ISR.

(5) In addition, the MME-B 100*b* requests the UE-B 100*b* to deactivate the ISR. In this case, in the conventional 3GPP, a mechanism by which the MME-B 100*b* can request the UE-B 100*b* to deactivate the ISR is not proposed. Therefore, according to one embodiment, in order to request the UE-B 100*b* to deactivate the ISR, the MME-B 100*b* may use a new NAS message. Alternatively, when there is another NAS message to be transmitted to the UE-B 100*b*, the MME-B 100*b* sends it by inserting an indicator indicating ISR deactivation. Alternatively, the MME-B 100*b* may transmit a TAU accept message/RAU accept message by inserting the indicator indicating the ISR deactivation only after the UE-B 100*b* performs TAU/RAU.

Upon receiving the ISR deactivation request, the UE-B 100*b* locally deactivates the ISR.

(6) As described above, the ISR deactivation is requested to the SGSN-B 420*b* and the UE-B 100*b*, and thereafter the MME-B 100*b* reports to the HSS 540 or the ProSe function server B 810*b* that the ISR is deactivated and thus a state is updated. This may be performed through an ISR status indication shown in Table 7 below.

(7) As such, since the ISR is deactivated, the ProSe related procedure can be effectively performed.

TABLE 7

| IE | Condition/Description |
|---|---|
| Action Indication | This IE shall include one of the applicable Values: Deactivation Indication: If this is set to 1, it indicates that an ISR is deactivated. Paging Indication: If this is set to 2, it indicates that a paging signal is transmitted to a UE in an idle state. |

Not all of the procedures described up to now with reference to FIG. 14 are necessarily performed, and only some steps thereof may be performed optionally.

The content described up to now can be implemented in hardware. This will be described with reference to FIG. 15.

Figure 15:
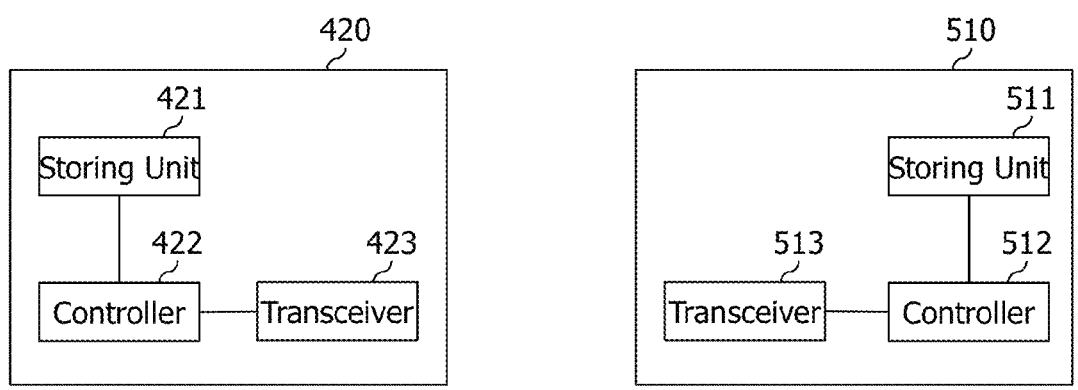
FIG. 15 is a block diagram of an SGSN 420 and an MME 510 according to a disclosure of the present specification.

FIG. 15 is a block diagram of an SGSN 420 and an MME 510 according to a disclosure of the present specification.

As shown in FIG. 15, the SGSN 420 includes a storage unit 421, a controller 422, and a transceiver 423. Further, the MME 510 includes a storage unit 511, a controller 512, and a transceiver 513.

The storage units 421 and 511 store the aforementioned method.

The controllers 422 and 512 control the storage units 421 and 511 and the transceivers 423 and 513. More specifically, the controllers 422 and 512 respectively execute the methods stored in the storage units 421 and 511. Further, the controllers 422 and 512 transmit the aforementioned signals via the transceivers 423 and 513.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method of determining whether to activate an idle mode signaling reduction (ISR) capability in a network entity for managing mobility of a user equipment (UE), the method comprising:

obtaining information related to a proximity service of the UE;

receiving from the UE a location update request message;

determining whether to activate the ISR on the basis of ISR capability information of a network node by which the UE has been served just previously, ISR capability information of the network entity, and information related to the proximity service of the UE; and transmitting a location update accept message to the UE after the determination, wherein the determining comprises one or more of:

confirming whether both of the network entity and the network node have an ISR capability on the basis of the ISR capability information of the network node and the ISR capability information of the network entity;

confirming whether the UE is scheduled to perform the proximity service; and confirming whether a network-assisted discovery is scheduled to be performed, wherein during the determining, even if it is confirmed that both of the network entity and the network node have the ISR capability, the ISR is determined to be deactivated when it is confirmed that the UE is scheduled to perform the proximity service and the network-assisted discovery is scheduled to be performed.

2. The method of claim 1, wherein the location update request message is a tracking area update (TAU) request message or a routing area update (RAU) request message.

3. The method of claim 1, wherein the information related to the proximity service of the UE comprises one or more of:
capability information for the proximity service of the UE;
proximity service enable state information of the UE;
information regarding whether the UE is in a state capable of performing the proximity service or is scheduled to perform the proximity service; and
information regarding a network-assisted discovery.

4. The method of claim 3, wherein if the information related to the proximity service of the UE comprises the information regarding the network-assisted discovery,
the information regarding the network-assisted discovery comprises one or more of:
information regarding whether the UE is a UE of a subscriber capable of using the network-assisted discovery service; and
information regarding whether a specific service is in a state in which the network-assisted discovery service is allowed for use.

5. The method of claim 1, further comprising:
upon receiving the location update request message, transmitting a request message for a context of the UE to a network by which the UE has been served just previously; and
receiving a context response message from the network node,
wherein the context response message comprises information regarding an ISR capability of the network node.

6. The method of claim 1, wherein if the determination result shows that the ISR is not activated, the location update accept message comprises an update result indicating that only a location update is performed.

7. The method of claim 1, wherein the network entity is a mobile management entity (MME), and the network node by which the UE has been served just previously is a serving general packet radio service support node (SGSN).

8. A method of determining whether to activate an idle mode signaling reduction (ISR) capability in a network entity for managing mobility of a user equipment (UE), the method comprising:
receiving by the network entity a context request message from a network node for newly serving the UE;
determining whether there is an ISR capability to be included in a context response message in response to the context request message on the basis of information related to the proximity service of the UE; and
transmitting to the network node the context response message generated depending on the determination,
wherein the information related to the proximity service of the UE comprises one or more of:
capability information regarding the proximity service of the UE;
proximity service enable state information of the UE;
information regarding whether the UE is in a state capable performing the proximity service or is scheduled to perform the proximity service; and
information regarding a network-assisted discovery,
wherein during the determining of whether there is the ISR capability, if it is confirmed that the UE is scheduled to perform the proximity service and the network-assisted discovery is scheduled to be performed, even if the network entity supports the ISR capability, the context response message is configured not to support the ISR capability.

9. The method of claim 8, wherein if the information related to the proximity service of the UE comprises the information regarding the network-assisted discovery,
the information regarding the network-assisted discovery comprises one or more of:
information regarding whether the UE is a UE of a subscriber capable of using the network-assisted discovery service; and
information regarding whether a specific service is in a state in which the network-assisted discovery service is allowed for use.

10. The method of claim 8, wherein if the network entity is a mobility management entity (MME), the network node is a serving general packet radio service support node (SGSN), and if the network entity is the SGSN, the network node is the MME.

* * * * *